C. G. SHANNON.
SNOOD FISHING HOOK KEEPER.
APPLICATION FILED JULY 16, 1909.

966,609.

Patented Aug. 9, 1910.

Witnesses
A. A. Adams
Jennie Derrett

Inventor
Charles Gay Shannon
by Smith Barnum
Attorney

UNITED STATES PATENT OFFICE.

CHARLES GAY SHANNON, OF KINGSTON, ONTARIO, CANADA.

SNOOD-FISHING-HOOK KEEPER.

966,609.

Specification of Letters Patent. Patented Aug. 9, 1910.

Application filed July 16, 1909. Serial No. 508,073.

*To all whom it may concern:*

Be it known that I, CHARLES GAY SHANNON, a subject of the King of Great Britain, residing in the city of Kingston, in the county of Frontenac and Province of Ontario, Canada, have invented a new and useful Improvement in Snood-Fishing-Hook Keepers, of which the following is a specification.

The object of my invention is to provide a snood fishing hook keeper, to which the fishing hooks may be attached in a manner in which they may be conveniently displayed as to sizes and styles as well as being readily detached therefrom.

The device is also constructed so that the hooks are attached thereto in such a manner that the barbs or points may not be damaged or exposed, whereby they might injure a person handling the keeper for the purpose of attaching or removing any of the hooks.

The device is also constructed and especially adapted to the purpose of containing a snood fishing hook in a manner that the snoods or hair lines attached to the hooks may not become knotted, broken or entangled with one another.

The object of my invention is to provide a snood fishing hook keeper whereby the hook may be attached thereto, and displayed whereby any hook may be readily detached without in any way interfering with the remaining hooks, and also that in handling the keeper there will be little or no chance of a person becoming injured by the sharp points or barbs of the hooks.

Figures 1, 2:
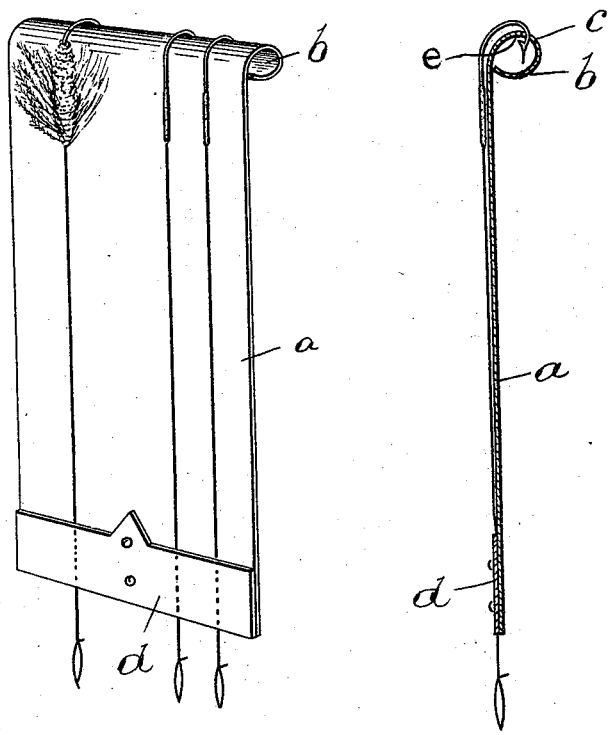
Figure 3:

In the drawings: Figure 1 is a perspective view of the keeper showing three hooks in position. Fig. 2 is a vertical sectional view, and Fig. 3 is an end view.

Like letters refer to like parts throughout the drawings and specification.

$a$, represents the body of the keeper consisting of a metal plate of a suitable length, and width, with one end terminating in a roll $b$, adapted to provide a pocket into which the ends of the hooks may enter.

$c$, designates an elongated slot formed through the roll $b$, to provide means by which the ends of the hooks may be inserted into the pocket $b$. The slot $c$ is situated at a distance away from the front face of the body of the keeper $a$ so that a ledge may be formed in the roll $b$ against which the barb of the hook or hooks would engage, to prevent them from becoming misplaced or detached from the roll $b$, except when it is desired to remove them.

Secured by rivets to the bottom of the front face of the keeper $a$, is a fastening leaf $d$. The fastening leaf $d$ is secured by rivets through the center part leaving both ends free to admit the snood lines being interposed between the fastening leaf $d$ and the keeper $a$, by which they are held in position taut on the front face of the body of the keeper.

To remove any of the hooks from the keeper, the projecting end of the snood line of the particular hook desired to be removed may be drawn from between the fastening leaf $d$, and the body of the keeper $a$, by being pulled sidewise, or it may be taken from the hook end and pulled upwardly, as sufficient spring exists in the fastening leaf $d$ to permit the snood line being pulled from between.

In the drawings I have shown three hooks with snood lines attached thereto, placed in position on the keeper and fastened thereto by the fastening leaf $d$.

It will be seen by reference to Fig. 2, that a shoulder $e$ is formed in the roll $b$, by the slot $c$, which the barbs of the hooks engage, and also that the hooks may not be removed from the pocket without first raising the body of the hook from the face of the body of the keeper.

The whole device is adapted to be conveniently carried within a coat pocket or leather case provided for the purpose.

What I claim as new and desire to secure by Letters Patent is:—

1. A snood fishing hook keeper, a body part consisting of a metal plate, one end of said body part terminating in a roll, said roll formed with an elongated slot to provide communication to the interior of said roll, the opposite end of said plate provided with a flat leaf secured by rivets to the front face of said body part as a fastening means for said snood line, as and for the purpose specified.

2. A snood fishing hook keeper, a body part consisting of a metal plate, one end of said body part coiled into a roll, an elongated slot formed in said roll, a flat leaf securely attached to the front face of said body part opposite from the said roll, the ends of said leaf being free, as and for the purpose specified.

3. A snood fishing hook keeper, a body part consisting of a sheet metal plate, one end terminating in a roll or coil to provide a pocket, an elongated slot formed in said roll communicating with said pocket, a fastening leaf secured by rivets to the top face at the opposite end of said body part, the said leaf riveted through the center part leaving the outer halves free, as and for the purpose specified.

Signed at Kingston, this 29th day of May 1909.

C. GAY SHANNON.

In the presence of—
W. B. CUNNINGHAM,
E. K. MAUND.